US012294788B2

(12) United States Patent
Soskind et al.

(10) Patent No.: US 12,294,788 B2
(45) Date of Patent: May 6, 2025

(54) WAVEGUIDE-BASED LIGHT FIELD CAMERA

(71) Applicants: Yakov Soskind, Plainsboro, NJ (US); Michael Soskind, Plainsboro, NJ (US); Rose Soskind, Plainsboro, NJ (US)

(72) Inventors: Yakov Soskind, Plainsboro, NJ (US); Michael Soskind, Plainsboro, NJ (US); Rose Soskind, Plainsboro, NJ (US)

(73) Assignee: COHERENT PHOTONICS LLC, Plainsboro, NJ (US)

( * ) Notice: Subject to any disclaimer, the term of this patent is extended or adjusted under 35 U.S.C. 154(b) by 184 days.

(21) Appl. No.: 18/144,304

(22) Filed: May 8, 2023

(65) Prior Publication Data

US 2024/0380990 A1 Nov. 14, 2024

(51) Int. Cl.
*H04N 23/957* (2023.01)
*G02B 6/42* (2006.01)
*H04N 23/50* (2023.01)

(52) U.S. Cl.
CPC ............. *H04N 23/957* (2023.01); *G02B 6/42* (2013.01); *G02B 6/4206* (2013.01); *H04N 23/50* (2023.01)

(58) Field of Classification Search
CPC ........ H04N 23/957; H04N 23/50; G02B 6/42; G02B 6/4206
See application file for complete search history.

(56) References Cited

U.S. PATENT DOCUMENTS

| 8,290,358 | B1 | 10/2012 | Georgiev |
| 9,372,347 | B1 | 6/2016 | Levola |
| 10,838,110 | B2 | 11/2020 | Glik |
| 11,115,573 | B2 | 9/2021 | Fahringer |
| 11,456,326 | B2 | 9/2022 | Carrion |
| 2017/0205618 | A1* | 7/2017 | Basset ................ G02B 23/26 |
| 2022/0179206 | A1* | 6/2022 | Amirsolaimani .... G02B 23/125 |
| 2022/0221733 | A1* | 7/2022 | Saari ..................... H04N 25/11 |

OTHER PUBLICATIONS

G. Wetzstein, et. al., "On plenoptic multiplexing and reconstruction." International journal of computer vision 101 (2013): 384-400.
R. Ng, et. al., Light field photography with a hand-held plenoptic camera. Tech. Report, CTSR 2005-02.

* cited by examiner

*Primary Examiner* — Gevell V Selby
(74) *Attorney, Agent, or Firm* — Stuart H. Mayer; Kaplan Breyer Schwarz LLP

(57) ABSTRACT

A plenoptic camera is described that is based on a waveguiding structure containing an array of diffractive regions. The waveguide-based plenoptic camera has reduced size and weight as compared to traditional camera approaches, as well as an expanded entrance aperture. Compared to traditional plenoptic cameras, which have microlens arrays placed in proximity to the sensor to serve as sub-apertures for the fractional fields, the waveguide-based plenoptic camera has its sub-apertures placed remote from the sensor area, within the in-coupling region of the waveguide.

20 Claims, 5 Drawing Sheets

WAVEGUIDE-BASED LIGHT FIELD CAMERA

I. FIELD OF THE INVENTION

Figure 1:
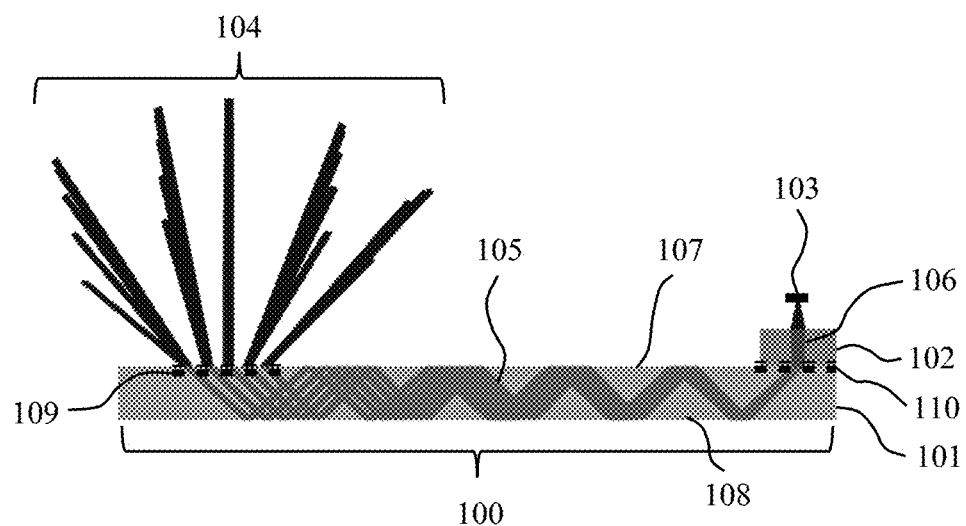

The present invention relates to the field of plenoptic sensors that detect the direction and intensity of optical radiation. More specifically, the invention relates to waveguide-based light field cameras, also known as plenoptic cameras.

II. BACKGROUND OF THE INVENTION

Traditional optical cameras are based on imaging principles, when the images of objects located within the camera field of regard are formed onto an array of photosensitive pixels. In certain sensing applications, high resolution images are of secondary importance.

Light field cameras, also referred to as plenoptic cameras, represent an alternative approach to traditional image-forming cameras. In the following description, the terms plenoptic cameras and light field cameras will be used interchangeably. Instead of forming high resolution images of objects on the photosensitive area representing spatial information, light field sensing pixels detect the directions and intensity of the incident light field representing angular information. Light field cameras are employed in place of imaging cameras when the presence of objects and their positional changes within the field of regard are more important, rather than detailed shapes of these objects.

Light field cameras commonly consist of an imaging assembly composed of several optical components, such as lenses and mirrors, and a micro-lens array placed between the optical components and the pixelated photosensitive area, as shown in embodiments of U.S. Pat. No. 11,456,326 "Plenoptic camera for mobile devices", U.S. Pat. No. 11,115,573 "Hyperspectral plenoptic camera" and 8,290,358 "Methods and apparatus for light-field imaging". As a result, traditional light field sensing cameras are relatively bulky, making them challenging to integrate into sensor systems with strict weight and spatial constraints.

III. SUMMARY OF THE INVENTION

In view of the foregoing, one object of the present invention is to provide light field camera sensing solutions with reduced size and weight.

Another object of the present invention is to provide light field cameras that can be fabricated in a cost-effective and scalable manner.

Still another object of the present invention is to provide light field cameras that can provide light field sensing solutions with independently controlled and non-uniformly spaced angular field distributions that are not limited by continuously varying lens surfaces of traditional cameras.

To achieve the desired goals, a plenoptic camera is described that is based on a waveguiding structure containing an array of diffractive regions. The waveguide-based plenoptic camera has reduced size and weight as compared to traditional camera approaches, as well as an expanded entrance aperture, making it a viable alternative for integration into consumer products and sensors with strict weight and size constraints. Compared to a traditional plenoptic camera, which has a microlens array placed near the sensor to serve as sub-apertures for the fractional fields, the waveguide plenoptic camera has its sub-apertures placed remote from the sensor area.

Waveguiding structures can be comprised of a plane-parallel plate made of optically transparent material, and usually contain a light in-coupling region (where the light enters the waveguide), a waveguiding region (where the in-coupled light experiences waveguiding propagation), and an out-coupling region (where the waveguided light exits the waveguiding structure). To further reduce the overall size and improve manufacturability, the in-coupling and out-coupling regions are often made as diffractive structures. Different types of diffractive structures can be employed within the in-coupling and out-coupling regions, such as linear gratings, meta-surfaces containing sub-wavelength surface-relief structures, or volume holographic structures composed of localized sub-wavelength volume refractive index modulations.

To achieve the waveguided propagation of the in-coupled fields within the waveguiding structure, the angles of the in-coupled light fields should exceed the critical angle at the waveguide planar interfaces, resulting in the formation of evanescent orders. In addition, angles of the diffracted in-coupled light fields need to satisfy the propagation condition for the working diffraction order (see for example Y. Soskind, "Field Guide to Diffractive Optics", SPIE Press, 2011, page 51). Therefore, the waveguided propagation can be expressed as:

$$\frac{1}{n_s} < \left| \frac{1}{n_s}\left(\sin(\theta_i) + \frac{\lambda}{d_g}\right) \right| < 1 \qquad (1)$$

where $\theta_i$ is the incident angle of the light field, $\lambda$ is the light field wavelength, $d_g$ is the grating's line spacing, and $n_s$ is the waveguiding structure substrate's refractive index. It is also assumed in equation (1) that the order of diffraction is m=1, and the index of refraction in air is $n_{Air} \approx 1$.

Objectives of the present invention are achieved in accordance with the following implementation techniques and design examples, as will be explained in detail in the following illustrative embodiments.

The features of the present invention, including the construction and operational details of the illustrative embodiments, will be described in reference to the accompanying drawings.

IV BRIEF DESCRIPTION OF THE DRAWINGS

FIG. 1 presents a side view of the waveguide-based light field camera normal to the waveguide propagation direction in accordance with the present invention.

Figure 2:
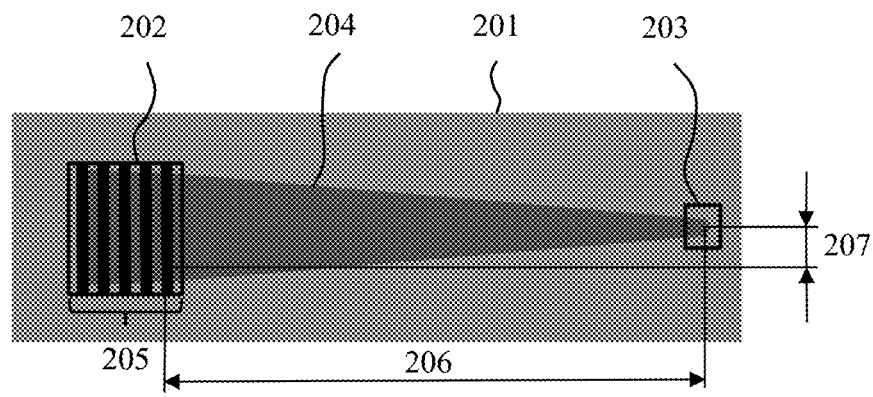

FIG. 2 presents a top view of the light field camera in accordance with the present invention.

Figure 3:
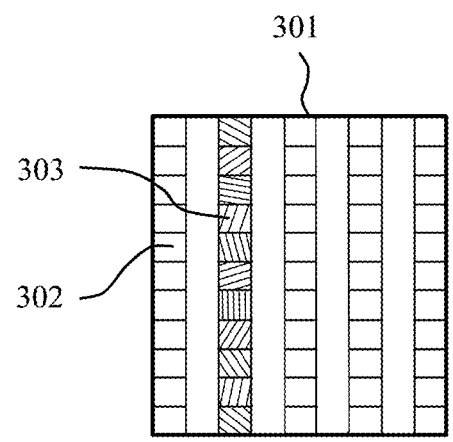
Figure 4:
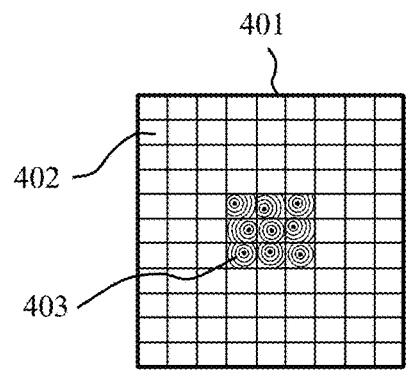
Figure 5:
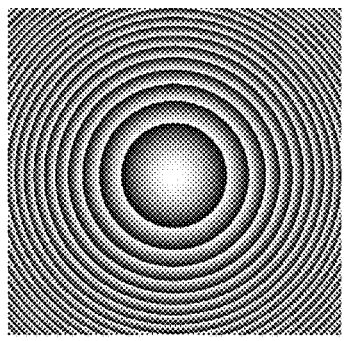
Figure 6:
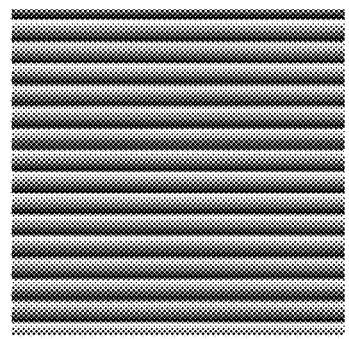
Figure 7:
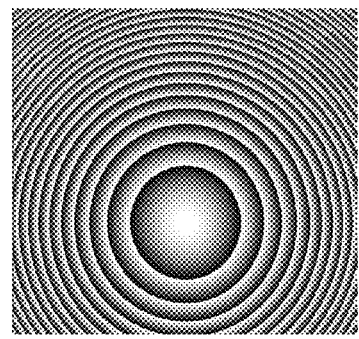
Figure 8:
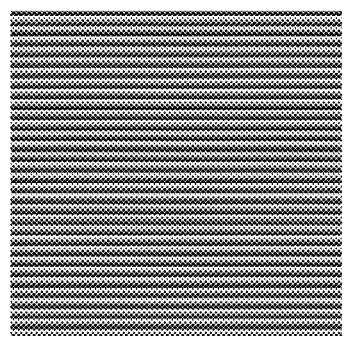
Figure 9:
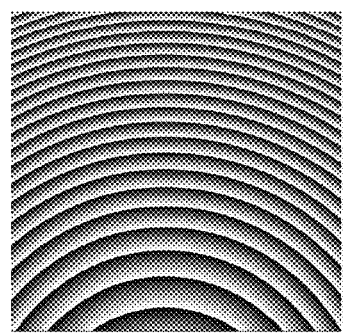
Figure 10:
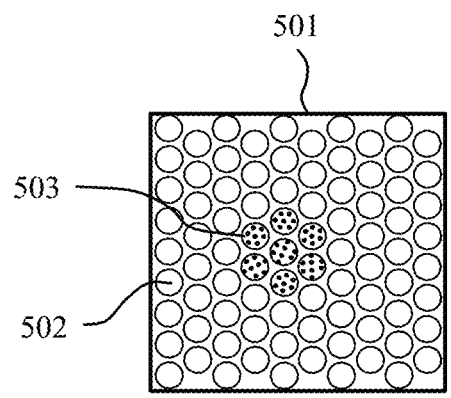
Figure 11:
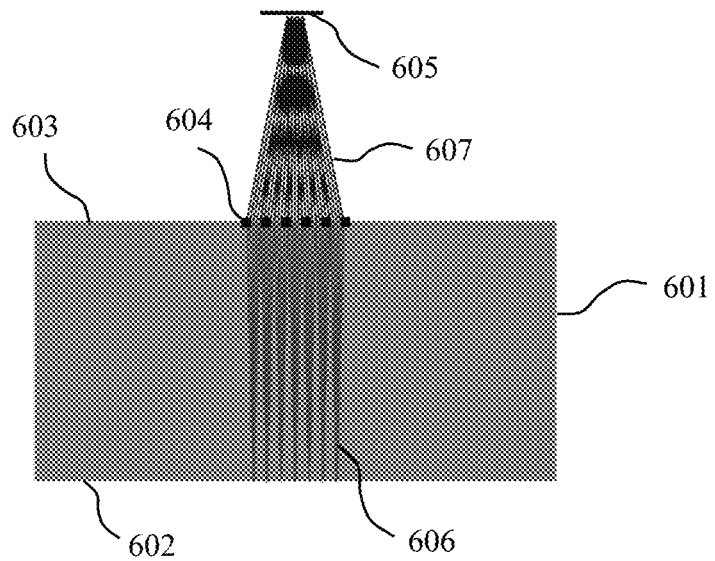
Figure 12:
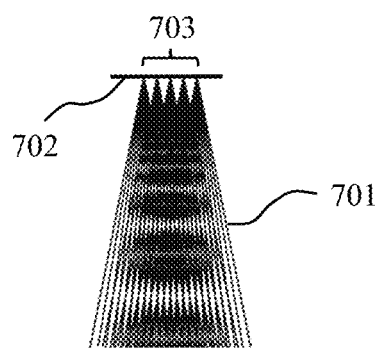
Figure 13:
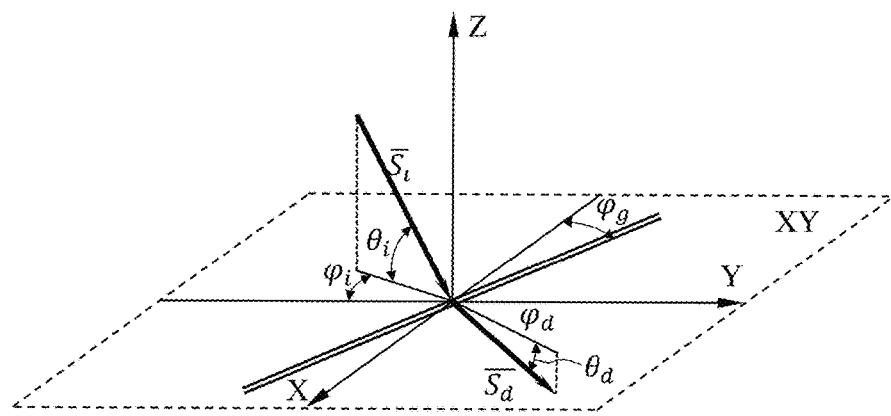
Figure 14:
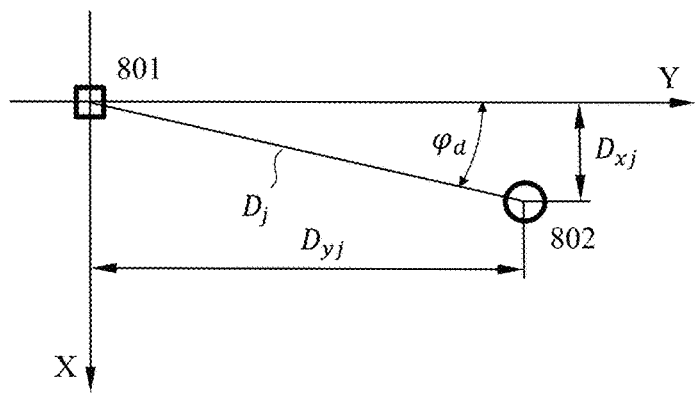
Figures 15, 16:
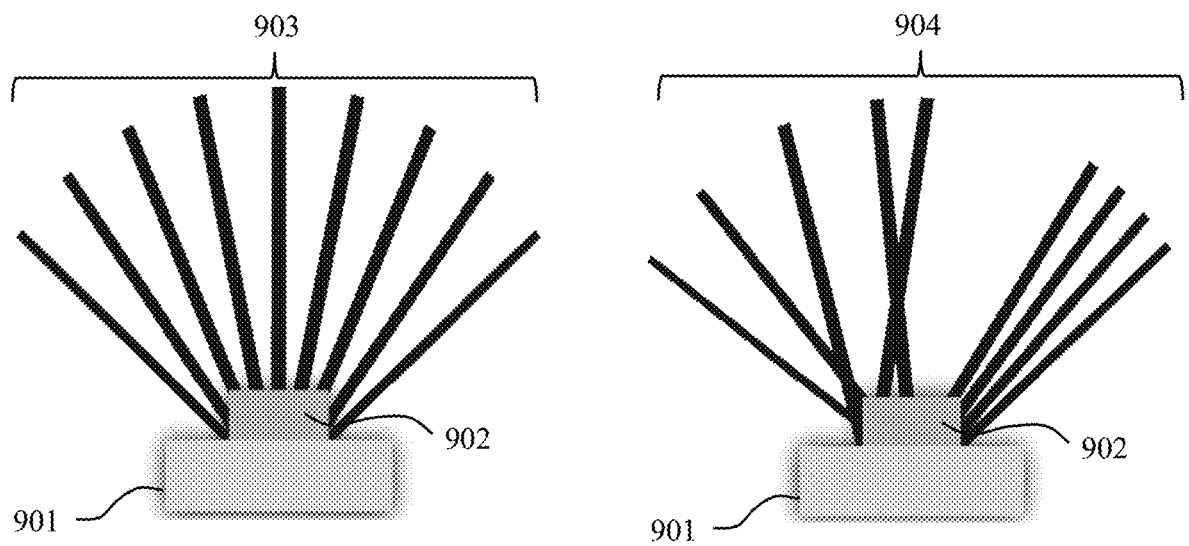
Figure 17:
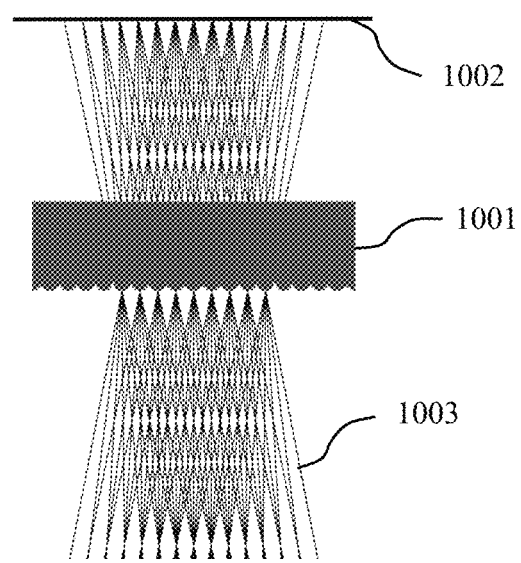

FIG. 3 presents the first layout of the in-coupling sub-regions of the light field camera waveguide FIG. 4 presents the second layout of the in-coupling sub-regions of the light field camera waveguide FIG. 5 presents spatial phase distribution of a diffractive lens centered over the in-coupling sub-region FIG. 6 presents spatial phase distribution of a diffractive grating placed over the in-coupling sub-region FIG. 7 presents spatial phase distribution of a diffractive lens offset from the center of the in-coupling sub-region FIG. 8 presents spatial phase distribution of a second diffractive grating placed over the in-coupling sub-region FIG. 9 presents another spatial phase distribution of a diffractive lens offset from the center of the in-coupling sub-region FIG. 10 presents the third layout of the in-coupling sub-regions of the light field sensor waveguide FIG. 11 presents the side view of the light fields propagating through the lens structure onto the photosensitive pixelated array FIG. 12 shows a close-up view of the light fields collected onto the photosensitive pixelated array FIG. 13 shows three-dimensional geometry defining diffraction of the incident light through the in-coupling grating within one of the in-coupling sub-regions FIG. 14 shows the top view of the waveguiding structure containing one of the in-coupling sub-regions and an out-coupling region FIG. 15 shows the side view of the waveguide-based light field camera along the waveguide propagation direction with the incoming light field directions in accordance with the first example FIG. 16 shows the side view of the waveguide-based light field camera along the waveguide propagation direction with the incoming light field directions in accordance with the second example FIG. 17 shows a close-up of the rays from the light fields collected onto the photosensitive area when a micro-lens array is inserted after the lens structure and before the photosensitive area

V. DETAILED DESCRIPTION

The present invention is further described in detail in the form of the specific embodiment. However, the present invention is not limited to only the specific embodiments described herein, and can be employed with a broad range of modifications to the disclosed embodiments.

FIG. 1 presents a side view of the plenoptic camera normal to the waveguide propagation direction in accordance to the present invention. The camera 100 contains a waveguiding structure 101 with planar interfaces, a lens module 102, and a photosensitive array of pixels 103. FIG. 1 also shows light 104 incident from multiple directions onto the in-coupling region 109 of the waveguiding structure 101. The incident light 104 is diffracted into the substrate of the waveguiding structure 101 at angles exceeding the critical angle of total internal reflection and is converted into waveguided modes 105 that travel within the waveguiding structure 101 while experiencing total internal reflection (TIR) at the planar interfaces 107 and 108. FIG. 1 shows an example of the waveguided light experiencing 9 instances of TIR on the planar interfaces of the waveguiding structure prior to reaching the out-coupling region. The number of TIRs within the waveguiding structure can differ, and will depend on the desired distance between the in-coupling and out-coupling regions. When the in-coupling and out-coupling regions are located on the same side of the waveguide, then the number of TIRs within the waveguiding structure experienced by the propagating light prior to reaching the out-coupling region will be odd. When the in-coupling and out-coupling regions are located on opposite sides of the waveguiding structure, then the number of TIRs within the waveguide experienced by the propagating light prior to reaching the out-coupling region will be even.

After reaching the out-coupling region 110, the waveguided light is outcoupled from the waveguiding structure 101 and directed into the lens 102. The lens 102 is shown in FIG. 1 as having planar interfaces. These types of lenses are fabricated using established lithographic techniques, and are well suited for integration with waveguiding structures having planar surfaces. It should be noted that lens components with at least one non-planar optical interface, such as spherical or aspherical refractive surface, can also be employed in place of the planar interface.

In the case of the lens 102 with planar interfaces shown in FIG. 1, the lens optical power is produced by the diffraction phenomenon. Diffractive optical power of the lens 102 is produced by diffractive regions fabricated either on one or both planar interfaces of the lens 102. Diffractive regions of the lens 102 can be comprised of different types of structures, including surface relief or encapsulated diffractive stair-case or blazed structures, surface relief or encapsulated sub-wavelength meta-optics structures, or volume Bragg grating and holograms comprised of localized sub-wavelength refractive index modulations of the lens optical medium.

The light 106 out-coupled from the region 110 propagates through the lens 102 and is directed onto the photosensitive pixelated array 103, where the light 106 is collected by the individual pixels of the photosensitive array 103. The individual pixels of the array 103 correspond to the specific angular directions of the in-coupled light, therefore allowing to reconstruct the directions and the associated intensities of light incident onto the light field sensor.

FIG. 2 presents a top view of the plenoptic camera waveguiding structure 201 in accordance with the present invention. The waveguiding structure 201 contains the in-coupling region 202 and the out-coupling region 203. The in-coupling region 202 serves as the entrance aperture of the camera, and is comprised of multiple sub-regions 205 with different diffractive properties. FIG. 2 also shows the footprint of the waveguided light 204 within the waveguiding structure 201 from the in-coupling region 202 to the out-coupling region 203. The entrance aperture area of the plenoptic camera of the present invention is significantly larger than the area of the out-coupling region.

FIGS. 3 through 5 present different in-coupling sub-regions layouts of the light field sensor waveguiding structure. FIG. 3 shows the in-coupling region 301 containing several rectangular-shaped in-coupling sub-regions 302 arranged in columns with separation gaps between the columns. FIG. 4 shows the in-coupling region 401 containing several rectangular-shaped in-coupling sub-regions 402 arranged in a two-dimensional array of rows and columns. FIG. 5 shows the in-coupling region 501 containing several circular-shaped in-coupling sub-regions 502 arranged in a two-dimensional array, for which every other column of the out-coupling sub-regions is vertically offset by half the vertical spacing between the sub-regions. While the in-coupling regions in FIGS. 3 through 5 may contain several tens or even hundreds of in-coupling sub-regions, only a limited number is shown for simplicity. The in-coupling sub-regions can also be made of different sizes and shapes, such as hexagons, triangles, etc.

The in-coupling sub-regions in FIGS. 3 through 5 are composed of different diffractive structures, such as gratings and lenses. Diffraction gratings within the individual in-coupling sub-regions have dissimilar line spacings and different azimuthal orientations of the gratings' lines. FIG. 3 schematically shows diffraction gratings 303 with different line spacings and azimuthal orientations within the in-coupling sub-regions 302 of the in-coupling region 301. The other gratings within the rest of the in-coupling sub-regions 302 are not shown in FIG. 3 for clarity.

When the in-coupling sub-regions are composed of diffraction lenses, the lenses within the individual sub-regions have different optical powers and different lateral offsets of the lens' centers from the respective in-coupling sub-regions' centroids, as shown schematically in FIG. 4 for a limited number of lenses 403 within the sub-regions 402 of the in-coupling region 401. The other lenses within the rest of the in-coupling sub-regions 402 are not shown in FIG. 4 for clarity.

FIG. 5 schematically presents spatial phase distribution of a diffractive lens centered to the in-coupling sub-region. FIG. 6 schematically presents spatial phase distribution of a diffraction grating placed over the in-coupling sub-region. The lens and grating functions can be combined in a single diffractive structure, resulting in a diffractive lens phase distribution that is offset from the in-coupling sub-region center, as shown in FIG. 7. FIG. 8 schematically presents spatial phase distribution of another diffraction grating placed over the in-coupling sub-region. The grating in FIG. 8 has smaller grating grooves spacing as compared with the grating in FIG. 6, and therefore has a stronger diffractive property. The lens and grating functions in respective FIG. 5 and FIG. 8 can be combined in a single diffractive structure, resulting in a diffractive lens phase distribution over the in-coupling sub-region shown in FIG. 9. The phase distribution in FIG. 9 represents a diffractive lens phase distribution that is offset from the in-coupling sub-region center. The amount of the lens offset is larger as compared to the offset shown in FIG. 7, with the lens center in FIG. 9 no longer positioned within the in-coupling sub-region boundaries.

FIG. 10 schematically shows a limited number of in-coupling sub-regions 502 containing sub-wavelength nano structures 503, also known as meta-atoms, with different placements within the respective sub-regions, relative nano structure spacings and sizes. Sub-wavelength nano structures within the other in-coupling sub-regions 502 of the in-coupling region 501 are not shown in FIG. 10 for clarity. The nano structures in FIG. 10 can be made in the form of nano-pillars or nano-holes of different shapes and sizes. The nano-structure combinations can produce diffraction grating and lensing functions, as well as their combinations.

FIG. 11 shows details of the lens module with planar interfaces in accordance with the present invention. The lens 601 consists of a block of an optical material transparent within the spectral region of the light field camera, such as optical glass, silicon, or fused silica. The lens 601 has two plane parallel optical surfaces 602 and 603. Surface 603 contains the diffractive region 604 that produces optical power. Alternative lens designs may contain diffractive regions fabricated on both lens surfaces 602 and 603, or solely on lens surface 602. The out-coupled light 606 propagates through the first lens surface 602 and the diffractive region 604 of the second lens surface 603. At the output of the diffractive region 604, the light 607 converges onto the pixelated photo-sensing array 605.

FIG. 12 presents an enlarged view of the region in FIG. 11 following surface 603, depicting the light rays 701 from the lens converging onto the individual pixels 703 of the photosensitive array 702.

In spite of their compact size and low weight, waveguiding structures have not been previously used to produce plenoptic cameras. Waveguiding structures have been used in the past in near-eye display applications to reduce the size and weight of the system, as explained for example in U.S. Pat. No. 9,372,347 "Display System" and U.S. Pat. No. 10,838,110 "Metasurface Optical Coupling Elements for a Display Waveguide". Design of the waveguiding structures employed in constructing plenoptic cameras is substantially different from the waveguiding structures employed in the near-eye display applications.

In the case of the near-eye displays, a single in-coupling region accepts input light from a variety of incident angles defined by the projection display size and the focal length of the collimating optics. It is desirable to increase the angular range of the near-eye displays to provide a more immersive user experience. As the in-coupled light propagates towards the exit pupil of the near-eye display, it is expanded by varying the number of internal reflections while performing fractional light outcoupling over multiple internal reflections to expand the output pupil of the near-eye display. Position of the in-coupling region of the near-eye display with respect to the out-coupling region along the waveguiding structure is loosely defined, as the out-coupling region is purposefully expanded to accommodate for inter-pupillary distance variations of different users.

In the case of the plenoptic camera of the present invention, a large number of in-coupling sub-regions is employed, each subregion dedicated to in-coupling of a single specific direction of the incoming light field. The number of in-coupling sub-regions can be in excess of several thousand or more. The area occupied by the in-coupling sub-regions of the plenoptic camera serves as an input aperture of the camera, and is significantly larger than the in-coupling region of the near-eye display or the out-coupling region of the camera itself. The in-coupled light from all of the in-coupling sub-regions is experiencing the same number of TIRs as it reaches the out-coupling region. Out-coupling efficiency of the light field camera is higher than that the out-coupling efficiency of the near-eye display, as most of the in-coupled light from the different light fields is intended to be out-coupled through a single interaction with the out-coupling region of the camera, as compared to multiple interactions with the out-coupling region in the case of the near-eye displays. Positions of the in-coupling sub-regions of the light field camera with respect to the out-coupling region along the waveguiding structure are precisely defined based on the specific light field directions, and represent one of the key parameters in designing plenoptic cameras.

Illustrative Example

In one particular example, the light field camera of the present invention is designed to operate at the wavelength of 1=0.94 µm. The lens module has a clear aperture of 0.25 mm and is made as a monolithic block of fused silica with a nominal thickness of 0.70 mm placed in proximity to the out-coupling region of the waveguide. The back working distance of the lens that defines the axial separation between the back surface of the lens and the photosensitive pixelated array is 0.55 mm. The diffractive optical power of the lens is defined by the lens polynomial phase ¢ function:

$$\Phi = A_1\rho^2 + A_2\rho^4 + A_3\rho^6 + A_4\rho^8 \qquad (2)$$

where ρ is the radial coordinate, and $A_1$, $A_2$, $A_3$ and $A_4$ are the radial phase coefficients of the diffractive lens surface defined in Table 1 below.

TABLE 1

| Optical prescription for the diffractive lens | | | | |
|---|---|---|---|---|
| Parameter | $A_1$ | $A_2$ | $A_3$ | $A_4$ |
| Value | −6002.4 | 175.6 | −992.4 | 1788.3 |

Designs of the in-coupling gratings within the individual in-coupling sub-regions need to take into account several parameters, including the direction of the incident light, diffraction on the in-coupling grating structures, and propagation of the diffracted light from the center of the in-coupling sub-regions to the center of the out-coupling region.

The pitch and azimuthal orientation of the diffractive structures at the centers of the in-coupling sub-regions depends on several parameters, such as the direction of the in-coupled light, position of the in-coupling sub-region with respect to the out-coupling region, thickness and refractive index of the waveguiding region, and number of TIR interactions of the in-coupled light prior to reaching the center of the out-coupling region.

FIG. 13 shows three-dimensional geometry defining diffraction of the incident light through the in-coupling grating within one of the in-coupling sub-regions. Propagation directions of the incident light and the light diffracted by the in-coupling sub-region are defined by respective unit vectors $S_I$ and $S_d$ in the Cartesian coordinate system. The X- and Y-axes define a plane XY, schematically shown as a dashed area, that contains the in-coupling region. The grating lines of the in-coupling grating in FIG. 13 are oriented at an angle $\varphi_g$ with respect to the X-axis of the coordinate system.

The unit vector $S_I$ is composed of three directional components $S_{ix}$, $S_{iy}$, and $S_{iz}$ along the respective X-axis, Y-axis and Z-axis unit vectors $\bar{i}$, $\bar{j}$, and $\bar{k}$:

$$\bar{S}_I = S_{ix}\bar{i} + S_{iy}\bar{j} + S_{iz}\bar{k} \qquad (3)$$

The individual components of the unit vector S are functions of the azimuth $\varphi_i$ and elevation $\theta_i$ angles shown in FIG. 13:

$$S_{ix} = \sin(\theta_i)\sin(\varphi_i) \qquad (4)$$

$$S_{iy} = \sin(\theta_i)\cos(\varphi_i) \qquad (5)$$

$$S_{iz} = \cos(\theta_i) \qquad (6)$$

Direction of the in-coupled light diffracted by the grating is defined by a unit vector $S_d$:

$$\bar{S}_d = S_{dx}\bar{i} + S_{dy}\bar{j} + S_{dz}\bar{k} \qquad (7)$$

The individual components of the unit vector Sa are functions of the diffracted azimuth $\varphi_d$ and elevation $\theta_d$ angles:

$$S_{dx} = \sin(\theta_d)\sin(\varphi_d) \qquad (8)$$

$$S_{dy} = \sin(\theta_d)\cos(\varphi_d) \qquad (9)$$

$$S_{dz} = \cos(\theta_d) \qquad (10)$$

By definition, components of the unit vectors $S_I$ and $S_d$ satisfy the following equations:

$$(S_{ix})^2 + (S_{iy})^2 + (S_{iz})^2 = 1 \qquad (11)$$

$$(S_{dx})^2 + (S_{dy})^2 + (S_{dz})^2 = 1 \qquad (12)$$

Components of the in-coupled unit vector can be found based on the following two equations that account for diffraction on the in-coupling grating structure, where n is the refractive index of the waveguide material:

$$n\sin(\theta_d)\sin(\varphi_d) = \sin(\theta_d)\sin(\varphi_i + \varphi_g) \qquad (13)$$

$$n\sin(\theta_d)\cos(\varphi_d) = \sin(\theta_d)\cos(\varphi_i + \varphi_g) + \frac{m\lambda}{d_j} \qquad (14)$$

Parameter m in equation (14) denotes the order of diffraction, $\lambda$ is the wavelength of the incident light, and $d_j$ is the line spacing of the grating structure of the j-th in-coupling region. In many cases, the gratings are designed to work in the first order of diffraction, so that m=1.

FIG. 14 shows the top view of the waveguiding structure containing one of the in-coupling sub-regions, denoted by an integer j, and an out-coupling region. Following diffraction on the grating structure, the in-coupled light travels a distance $D_j$ along the waveguiding structure from the center of the in-coupling sub-region to the center of the out-coupling region. While the specific distances between the individual in-coupling sub-regions and the out-coupling region of the camera depend on their respective locations within the in-coupling region, the number of TIRs by the in-coupled light prior to reaching the out-coupling region is the same for all of the in-coupling sub-regions. For the case shown and described by the embodiment, the in-coupling sub-regions and the out-coupling region are located on the same surface of the waveguiding structure. Therefore, the in-coupled light will undergo an odd integer number of TIRs as it propagates to the center of the out-coupling region. The two regions can also be on opposite surfaces of the waveguide, resulting in an even integer number of TIRs. These conditions impose additional constraints on the orientations and line spacings of the in-coupling gratings.

FIG. 14 illustrates the geometrical relations between an in-coupling sub-region 801, schematically shown as a square, and a circular-shaped out-coupling region 802. The in-coupling sub-region 801 is connected to the out-coupling region 802 by a line $D_j$ representing the distance between the two regions along the waveguide surface parallel to the XY plane. FIG. 14 also shows the respective X-axis and Y-axis lateral distances $D_{xj}$ and $D_{yj}$ between the centers of the in-coupling sub-region and the out-coupling region. The distance $D_j$ can be found as:

$$D_j = \sqrt{(D_{xj})^2 + (D_{yj})^2} \qquad (15)$$

Following diffraction on the in-coupling grating structure, the in-coupled light will propagate towards the center of the out-coupling region within a plane defined by the direction of the in-coupled light $S_d$ and the normal to the waveguide surface defined by the Z-axis vector $\bar{k}$. The in-coupled light will encounter multiple TIRs.

Between each consecutive TIR, the in-coupled light will advance towards the center of the out-coupling region by an incremental distance $\Delta D_j$:

$$\Delta D_j = \frac{T}{\tan(\theta_{dj})} \quad (16)$$

where T is the waveguide thickness, defined as the distance between the planar interfaces of the waveguiding structure, and $\theta_{dj}$ is the elevation angle of the light field after diffraction on the j-th in-coupling sub-region.

The distance $D_j$ contains an integer number N of TIR steps during propagation:

$$D_j = N\Delta D_j \quad (17)$$

For a given direction of the incident light $S_i$, the distance $D_j$ between the in-coupling sub-region and the out-coupling region, thickness T and refractive index n of the waveguide, operating wavelength $\lambda$, and required number of TIR steps within the waveguide N, the equations (3) through (17) can be solved to yield the line spacings $d_j$ of the in-coupling gratings and their azimuthal orientations $\varphi_g$.

As an example of a light field camera in accordance with the present invention, we present the in-coupling grating parameters for 45 in-coupling sub-regions of a waveguiding structure made of fused silica with refractive index n=1.4512 and thickness of T=1.0 mm. The gratings are working in the first diffraction order m=1 at the operating wavelength 1=940 nm. Each grating structure is designed to produce 9 TIRs within the waveguide before reaching the center of the out-coupling structure.

Parameters of the gratings within the individual in-coupling sub-regions and the associated incident light field directions are listed in Table 2.

TABLE 2

Parameters of the in-coupling gratings regions

| In-coupling sub-region's number j | In-coupled light field X-axis directional component $S_{ix}$ | In-coupled light field Y-axis directional component $S_{iy}$ | Grating's line spacing $d_j$ (μ) | Grating's azimuthal orientation $\varphi_g$ (deg.) |
|---|---|---|---|---|
| 1 | 0 | 0 | 0.862 | 0.0 |
| 2 | 0.174 | 0 | 0.851 | 9.0 |
| 3 | 0.342 | 0 | 0.823 | 17.4 |
| 4 | 0.500 | 0 | 0.784 | 24.6 |
| 5 | 0.643 | 0 | 0.743 | 30.5 |
| 6 | −0.174 | 0 | 0.851 | −9.0 |
| 7 | −0.342 | 0 | 0.823 | −17.4 |
| 8 | −0.5 | 0 | 0.784 | −24.6 |
| 9 | −0.643 | 0 | 0.743 | −30.5 |
| 10 | 0 | 0.174 | 1.025 | 0 |
| 11 | 0.174 | 0.174 | 1.007 | 10.7 |
| 12 | 0.342 | 0.174 | 0.961 | 20.4 |
| 12 | 0.500 | 0.174 | 0.900 | 28.6 |
| 14 | 0.643 | 0.174 | 0.840 | 35.0 |
| 15 | −0.174 | 0.174 | 1.007 | −10.7 |
| 16 | −0.342 | 0.174 | 0.961 | −20.4 |
| 17 | −0.5 | 0.174 | 0.900 | −28.6 |
| 18 | −0.643 | 0.174 | 0.840 | −35.0 |
| 19 | 0 | −0.342 | 0.656 | 0 |
| 20 | 0.174 | −0.342 | 0.651 | 6.9 |
| 21 | 0.342 | −0.342 | 0.638 | 13.4 |
| 22 | 0.500 | −0.342 | 0.620 | 19.2 |
| 23 | 0.643 | −0.342 | 0.599 | 24.2 |
| 24 | −0.174 | −0.342 | 0.651 | −6.9 |
| 25 | −0.342 | −0.342 | 0.638 | −13.4 |
| 26 | −0.5 | −0.342 | 0.620 | −19.2 |
| 27 | −0.643 | −0.342 | 0.599 | −24.2 |
| 28 | 0 | 0.500 | 1.592 | 0 |
| 29 | 0.174 | 0.500 | 1.527 | 16.4 |
| 30 | 0.342 | 0.500 | 1.378 | 30.1 |
| 31 | 0.500 | 0.500 | 1.215 | 40.3 |
| 32 | 0.643 | 0.500 | 1.077 | 47.4 |
| 33 | −0.174 | 0.500 | 1.527 | −16.4 |
| 34 | −0.342 | 0.500 | 1.378 | −30.1 |
| 35 | −0.5 | 0.500 | 1.215 | −40.3 |
| 36 | −0.643 | 0.500 | 1.077 | −47.4 |
| 37 | 0 | −0.643 | 0.542 | 0 |
| 38 | 0.174 | −0.621 | 0.547 | 5.8 |
| 39 | 0.342 | −0.567 | 0.555 | 11.7 |
| 40 | 0.500 | −0.507 | 0.561 | 17.4 |
| 41 | 0.643 | −0.455 | 0.562 | 22.6 |
| 42 | −0.174 | −0.621 | 0.547 | −5.8 |
| 43 | −0.342 | −0.567 | 0.555 | −11.7 |
| 44 | −0.500 | −0.507 | 0.561 | −17.4 |
| 45 | −0.643 | −0.455 | 0.562 | −22.6 |

FIG. 15 presents an illustrative side view of the plenoptic camera along the waveguide propagation direction in accordance with the presented example. It shows the waveguiding structure 901 with planar interfaces and a lens module 902. FIG. 15 also shows directions of the light fields 903 incident from multiple directions onto the in-coupling region of the waveguiding structure. Directions of the individual incident fields correspond to the in-coupled sub-regions 1 through 9 with gratings parameters listed in Table 2. The in-coupling directions of the incident light shown in FIG. 15 are incrementally spaced at equal angular intervals.

The present invention provides significant flexibility in defining directions of the incident light by adjusting the properties of the diffractive structures of the individual in-coupling sub-regions. That makes it different from traditional light field cameras, where the incident light directions are constrained by the surface shapes of the continuous refractive lens elements.

FIG. 16 presents a second example of a side view of the plenoptic camera along the waveguide propagation direction in accordance to the present invention. It shows the waveguiding structure 901 with planar interfaces and a lens module 902. FIG. 16 also shows directions of the light 903 incident from multiple directions onto the in-coupling region of the waveguiding structure. Directions of the individual incident fields correspond to the in-coupled sub-regions 1 through 9 with gratings parameters listed in Table 3. The in-coupling directions of light shown in FIG. 16 are spaced at non-equal angular intervals, with some of the neighboring light fields in-coupled from different angular quadrants. The rest of the components of the camera, including the outcoupling region, the lens module 102, and the photosensitive pixelated array are the same as those in the first example, and are not shown in FIG. 16.

Parameters of the gratings within the individual in-coupling sub-regions 1 through 9 and the associated incident light field directions for the second example are shown in FIG. 16 and are listed in Table 3.

TABLE 3

Parameters of the in-coupling gratings regions corresponding to the incoming light fields for the second example

| In-coupling sub-region's number j | In-coupled light field X-axis directional component $S_{ix}$ | In-coupled light field Y-axis directional component $S_{iy}$ | Grating's line spacing $d_j$ (μ) | Grating's azimuthal orientation $\varphi_g$ (deg.) |
|---|---|---|---|---|
| 1 | 0.1 | 0 | 0.862 | 5.3 |
| 2 | 0.6 | 0 | 0.755 | 28.8 |
| 3 | 0.75 | 0 | 0.710 | 34.5 |
| 4 | −0.2 | 0 | 0.848 | −10.4 |
| 5 | 0.17 | 0 | 0.852 | 8.9 |
| 6 | −0.5 | 0 | 0.784 | −24.6 |
| 7 | −0.55 | 0 | 0.770 | −26.8 |
| 8 | −0.6 | 0 | 0.755 | −28.8 |
| 9 | −0.65 | 0 | 0.740 | −30.8 |

To receive additional information associated with objects depth, i.e. with the object space distances of the light field reflected form different objects, a micro-lens array is added between the lens module and the photosensitive pixelated array, as shown in FIG. 17. Employment of micro-lens arrays to extract depth information with light field cameras has been discussed in detail in the past, see R. Ng, et. al., Light field photography with a hand-held plenoptic camera, Stanford Tech. Report, 2005-02; G. Wetzstein, et. al., "On plenoptic multiplexing and reconstruction." International journal of computer vision 101 (2013): 384-400. The distance of the image plane with respect to the micro-lens array can be different. The image plane can be located at the micro-lens array surface, as shown in FIG. 17. It can be also placed before or after the micro-lens array surface. The micro-lens array is shown in FIG. 17 as being composed of refractive micro-lenses. It can be also composed of diffractive micro-lenses, where each micro-lens structures can be composed of blazed ridges, multi-step binary structures, or metasurface subwavelengths structures.

Implementation details of the waveguide-based light field camera in accordance with the present invention provide specific design examples of the system. It is understood that numerous other examples of light field cameras can be constructed by those skilled in the art based on the provided description and associated details, and using different incident light field directions, operating wavelengths, waveguide geometries, and materials.

REFERENCES

1. U.S. Pat. No. 11,456,326 "Plenoptic camera for mobile devices", issued Sep. 27, 2022.
2. U.S. Pat. No. 11,115,573 "Hyperspectral plenoptic camera", issued Sep. 7, 2021.
3. U.S. Pat. No. 8,290,358 "Methods and apparatus for light-field imaging", issued Oct. 16, 2012.
4. Y. Soskind, "Field Guide to Diffractive Optics", SPIE Press, 2011, page 51.
5. U.S. Pat. No. 9,372,347 "Display System", issued Jun. 21, 2016.
6. U.S. Pat. No. 10,838,110 "Metasurface Optical Coupling Elements for a Display Waveguide", issued Nov. 17, 2020.
7. G. Wetzstein, et. al., "On plenoptic multiplexing and reconstruction." International journal of computer vision 101 (2013): 384-400.
8. R. Ng, et. al., Light field photography with a hand-held plenoptic camera. Tech. Report, CTSR 2005-02.

The invention claimed is:

1. A waveguide-based light field camera system for sensing the magnitude and direction of the individual light fields, the system comprising:
   an optical waveguiding structure containing in-coupling and out-coupling regions;
   a lens structure positioned to capture out-coupled light field radiation from the out-coupling regions of the optical waveguiding structure;
   a photosensitive pixelated array located after said lens structure for collecting the out-coupled light field radiation and converting the out-coupled light field radiation into electrical signals,
   wherein the in-coupling region of the said waveguiding structure is composed of multiple in-coupling sub-regions, and
   wherein the in-coupling sub-regions include diffractive structures with different diffractive properties.

2. The waveguide-based light field system in accordance with claim 1, wherein a micro-lens array is placed between the lens structure and the photosensitive pixelated array.

3. The waveguide-based light field system in accordance with claim 1, wherein a line spacing and azimuthal orientation of the diffractive structures depend on relative positions of the in-coupling sub-regions with respect to the out-coupling region.

4. The waveguide-based light field system in accordance with claim 1, wherein a line spacing and azimuthal orientation of the diffractive structures depend on a propagation direction of incoming radiation.

5. The waveguide-based light field system in accordance with claim 1, wherein at least one of the two optical interfaces of the lens structure comprises a diffractive lens surface having sub-wavelength-sized surface-relief structures.

6. The waveguide-based light field system in accordance with claim 5, wherein the diffractive sub-wavelength-sized surface-relief structures are encapsulated by a layer of optically transparent material with a refractive index dissimilar from a refractive index of said sub-wavelength-sized surface-relief structures.

7. The waveguide-based light field system in accordance with claim 1, wherein the in-coupling sub-regions of the in-coupling region contain different types of diffractive structures.

8. The waveguide-based light field system in accordance with claim 7, wherein the in-coupling sub-regions of the in-coupling region include different diffraction gratings.

9. The waveguide-based light field system in accordance with claim 8, wherein the diffraction gratings within the in-coupling sub-regions include diffraction gratings with different line spacings.

10. The waveguide-based light field system in accordance with claim 8, wherein the diffraction gratings within the in-coupling sub-regions include diffraction gratings having lines with different azimuthal angular orientations.

11. The waveguide-based light field system in accordance with claim 7, wherein the in-coupling sub-regions include diffractive lenses with different optical properties.

12. The waveguide-based light field system in accordance with claim 11, wherein the diffractive lenses within corresponding in-coupling sub-regions are offset from respective centers of the in-coupling sub-regions.

13. The waveguide-based light field system in accordance with claim 1, wherein the out-coupling region of the waveguiding structure includes a diffractive region.

14. The waveguide-based light field system in accordance with claim 13, wherein the diffractive region of the out-coupling region is composed of surface-relief sub-wavelength diffractive structures.

15. The waveguide-based light field system in accordance with claim 14, wherein said surface-relief sub-wavelength diffractive structures are encapsulated by a layer of optically transparent material with a refractive index dissimilar from the refractive index of said surface-relief sub-wavelength diffractive structures.

16. The waveguide-based light field system in accordance with claim 14, wherein the diffractive region of the out-coupling region includes localized sub-wavelength refractive index modulations.

17. The waveguide-based light field system in accordance with claim 1, wherein a lateral size of each in-coupling sub-region of the optical waveguiding structure has a size about equal to a size of the out-coupling region of the optical waveguiding structure.

18. The waveguide-based light field system in accordance with claim 1, wherein a lateral size of the in-coupling region of the optical waveguiding structure is larger than a size of the out-coupling region of the optical waveguiding structure.

19. The waveguide-based light field system in accordance with claim 1, wherein an area of the in-coupling region of the optical waveguiding structure is at least N times an area of the out-coupling region of the optical waveguiding structure.

20. A method of performing light field sensing using a waveguiding structure, comprising the following steps:
- directing incident light from multiple angular directions onto in-coupling sub-regions of an in-coupling region of the waveguiding structure;
- in-coupling input light fields through individual in-coupling sub-regions into the waveguiding structure;
- directing said in-coupled input light fields towards a center of an out-coupling region of the waveguiding structure;
- waveguiding the in-coupled input light fields within the waveguiding structure as waveguided modes undergoing total internal reflection at planar interfaces of said waveguiding structure;
- out-coupling the waveguided light fields from the waveguiding structure and directing the out-coupled waveguided light fields toward a lens module;
- transmitting the out-coupled waveguided light fields through said lens module onto a photosensitive area of a pixelated array;
- converting individual light fields by the individual pixels of the photosensitive area of the pixelated array into electrical signals, said electrical signals representing a magnitude and direction of the individual light fields; and
- post-processing the electrical signals to extract information about the magnitude and direction of the in-coupled input light fields.

* * * * *